US009232358B2

(12) United States Patent
Chen et al.

(10) Patent No.: US 9,232,358 B2
(45) Date of Patent: Jan. 5, 2016

(54) METHOD AND APPARATUS FOR REUSING MBSFN SUBFRAMES

(75) Inventors: Yu Chen, PuDong Jinqiao Shanghai (CN); Yonggang Wang, PuDong Jinqiao Shanghai (CN); Zhongji Hu, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 46 days.

(21) Appl. No.: 13/637,431

(22) PCT Filed: Mar. 26, 2010

(86) PCT No.: PCT/CN2010/000382
§ 371 (c)(1),
(2), (4) Date: Sep. 26, 2012

(87) PCT Pub. No.: WO2011/116503
PCT Pub. Date: Sep. 29, 2011

(65) Prior Publication Data
US 2013/0010672 A1    Jan. 10, 2013

(51) Int. Cl.
*H04H 20/71* (2008.01)
*H04W 4/06* (2009.01)
(52) U.S. Cl.
CPC . *H04W 4/06* (2013.01); *Y02B 60/50* (2013.01)
(58) Field of Classification Search
CPC .................................. H04W 4/06; Y02B 60/50
See application file for complete search history.

(56) References Cited

U.S. PATENT DOCUMENTS

| 2008/0311926 | A1  | 12/2008 | Fischer et al. |
| 2009/0175179 | A1  | 7/2009  | Stewart et al. |
| 2009/0185543 | A1* | 7/2009  | Chen et al. ............... 370/338 |
| 2009/0252077 | A1* | 10/2009 | Khandekar et al. ....... 370/312 |
| 2010/0009687 | A1* | 1/2010  | Koivisto et al. ........... 455/450 |
| 2010/0034135 | A1  | 2/2010  | Kim et al. |
| 2011/0116438 | A1  | 5/2011  | Tsunekawa et al. |
| 2011/0211467 | A1* | 9/2011  | Bhat ........................... 370/252 |

FOREIGN PATENT DOCUMENTS

| CN | 101547398 A | 9/2009 |
| CN | 101656717 A | 2/2010 |
| CN | 101675634 A | 3/2010 |
| EP | 2 296 301 A1 | 3/2011 |
| EP | 2 311 204    | 4/2011 |

(Continued)

OTHER PUBLICATIONS

International Search Report for PCT/CN2010/000382 dated Jan. 6, 2011.

(Continued)

*Primary Examiner* — Charles C Jiang
*Assistant Examiner* — Thad Defauw
(74) *Attorney, Agent, or Firm* — Fay Sharpe LLP

(57) ABSTRACT

A method and apparatus for reusing a multicast broadcast single frequency network (MBSFN) subframe are disclosed. The method comprises configuring a policy of using unicast on a reused MBSFN subframe; and implementing the configured policy to reuse the MBSFN subframe. By using the above technical solution, it is enabled to implement transmitting unicast services on an MBSFN subframe while achieving a balance between power saving and implementation complexity, without affecting the existing protocol.

9 Claims, 2 Drawing Sheets

(56) References Cited

FOREIGN PATENT DOCUMENTS

| | | |
|---|---|---|
| KR | 2010-0018453 A | 2/2010 |
| WO | WO 2008/153302 | 12/2008 |
| WO | WO 2009/157487 A1 | 12/2009 |
| WO | WO 2010/005036 A1 | 1/2010 |
| WO | WO 2010/016693 A | 2/2010 |

OTHER PUBLICATIONS

Alcatel-Lucent Shanghai Bell, "Discussion for response to LS (R1-093748) on unicast transmission in MBSFN subframes," 3GPP TSG-RAN WG RAN1 #58bis, R1-093759, Miyazaki, Japan, Oct. 12-16, 2009, pp. 1-3.

* cited by examiner

METHOD AND APPARATUS FOR REUSING MBSFN SUBFRAMES

FIELD OF THE INVENTION

The present invention relates to the field of radio multicast, and more specifically, relates to a method and apparatus for reusing an MBSFN subframe.

BACKGROUND OF THE INVENTION

Unused MB (multicast broadcast) SFN (single frequency network) subframes can be found in actually used radio resources. The current specification does not support sharing of these subframes. Some schemes have been proposed to reuse these subframes. Some of these schemes propose monitoring all MBSFN subframes. However, such solution has a large power-consumption, while for a user equipment (UE), saving power is an important indicator. Some other schemes propose to send a signaling to indicate reuse of MBSFN subframes in a physical downlink control channel (PDCCH); however, this solution is complex to implement and meanwhile will affect the physical layer. At the same time, all of these schemes explicitly require re-writing the RAN1 protocol, such that they will affect the entire RAN1 architecture.

Therefore, it is desirable for a solution of reusing MBSFN subframes, which will not cause impact on the current protocol while achieving a balance between power saving and implementation complexity.

SUMMARY OF THE INVENTION

An objective of the present invention lies in providing a method and apparatus for reusing an MBSFN subframe, so as to reuse the MBSFN subframe without affecting the current protocol.

A method for reusing an MBSFN subframe is provided. The method comprises: configuring a policy of using unicast on the reused MBSFN subframe; and implementing the configured policy to reuse the MBSFN subframe.

A mobile terminal is further provided. The mobile terminal comprises a configuration unit for configuring a policy of using unicast on the reused MBSFN subframe; and an implementation unit for implementing the configured policy to reuse the MBSFN subframe.

A communication system is further provided. The communication system comprises the aforementioned mobile terminal, a base station for providing an MBMS service for the mobile terminal, and a device for connecting between base stations.

Through the above technical solution, the technical solution provided by the embodiments of the present invention can implement transmission of a unicast service on an MBSFN subframe while achieving a balance between power saving and implementation complexity, without affecting the existing protocol.

BRIEF DESCRIPTION OF THE DRAWINGS

Based on the following description with reference to the accompanying drawings, advantages of the present invention will become more comprehensible, wherein.

DETAILED DESCRIPTION OF EMBODIMENTS

Hereinafter, the present invention will be described in detail with reference to the accompanying drawings.

Figure 1:
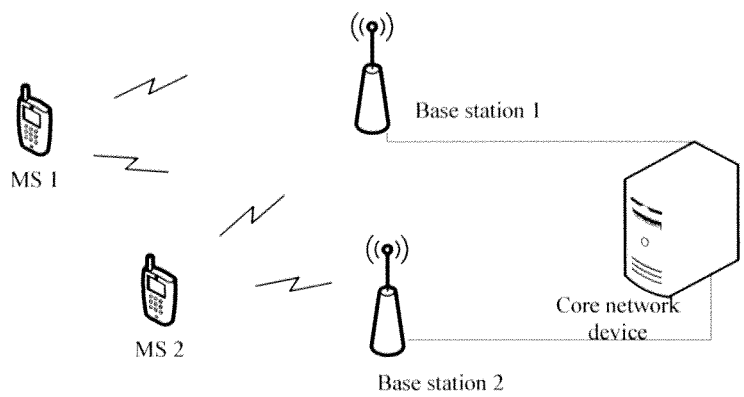
FIG. 1 is a structural block diagram of a communication system according to the embodiments of the present invention.

FIG. 1 illustrates a system structural diagram according to the embodiments of the present invention. As illustrated in FIG. 1, the system comprises a plurality of base stations (eNBs) and a plurality of mobile terminals (UEs), wherein UE1 is supposed to be the currently used mobile terminal, and base station 1 is supposed to be the serving base station for UE1. However, those skilled in the art would appreciate that an actually deployed network may have more or less amount of base stations and mobile terminals; the interconnection between a plurality of base stations may also be implemented in other manner, not merely implemented through the core network device as exemplarily shown in FIG. 1.

Figure 2:
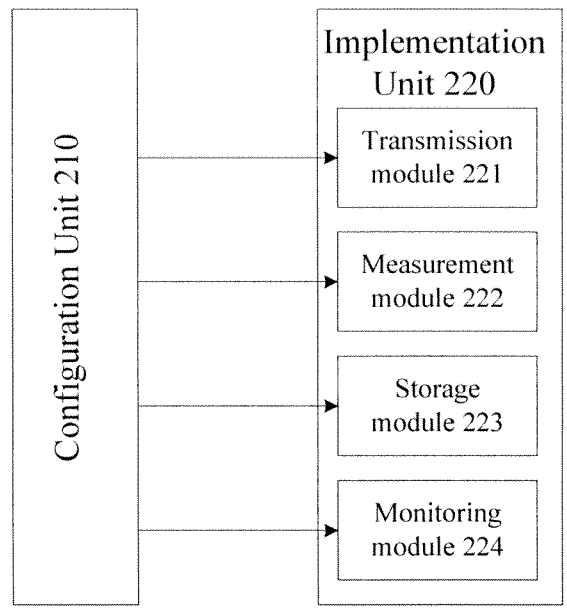
FIG. 2 shows a block diagram of a mobile terminal in the system as shown in FIG. 1.

There is further provided a mobile terminal. As shown in FIG. 2, the mobile terminal may comprise a configuration unit 210 for configuring a policy of using unicast on a reused MBSFN subframe; an implementation unit 220 for implementing the configured policy to reuse the MBSFN subframe.

The configuration unit 210 may configure the policy as using a subframe of a unicast type when reusing an MBSFN subframe. The implementation unit 220 may comprise a transmission module 221 for performing unicast communication on the reused MBSFN subframe based on the configuration by the configuration unit 210. Here, performing unicast communication on the reused MBSFN subframe means performing unicast communication using resources of the reused MBSFN subframe.

The configuration unit 210 may configure the policy as not performing mobility measurement when reusing an MBSFN subframe. The implementation unit 220 may further comprise a measurement module 222 for performing mobility measurement on other MBSFN subframes except the reused MBSFN subframe based on the configuration by the configuration unit 210. Preferably, the configuration unit 210 may simply configure the policy as allowing transmitting a unicast service in the MBSFN subframe.

The configuration unit 210 may configure the policy as not considering a reused unicast into neighboring cells information. The implementation unit 220 may further comprise a storage module 223 for not including content related to unicast when configuring the stored list of neighboring cells based on the configuration by the configuration unit 210.

The configuration unit 210 may configure the policy as indicating for a subframe that will not be used any more and/or an MBSFN subframe that is allowed to be reused. The implementation unit 220 may further comprise a monitoring module 224 for determining and monitoring occurrence of such a subframe that is an MBSFN subframe and is set to allow to use. Preferably, the information regarding a subframe that will not be used any more and/or an MBSFN subframe that is allowed to be reused as configured by the configuration unit may be sent from a serving base station via a BCCH channel.

Although the mobile terminal of the present embodiment has been described in the form of separate functional modules, each component as illustrated in FIG. 2 may be implemented by a plurality of devices in actual applications, and the plurality of components as shown may also be integrated into one chip or one device in actual applications. Hereinafter, the method of reusing a subframe as implemented by the above mobile terminal will be explained in detail.

Figure 3:
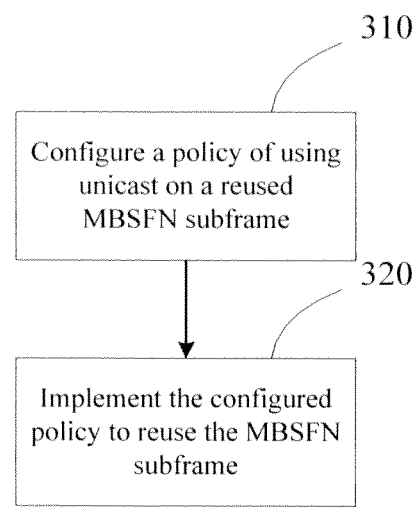
FIG. 3 shows a flow chart of a method for reusing an MBSFN subframe according to the embodiments of the present invention.

FIG. 3 shows a flow chart of a method for reusing an MBSFN subframe according to the embodiments of the present invention. As illustrated in FIG. 3, in step 310, the configuration unit 210 configures a policy of using a unicast on a reused MBSFN subframe. In step 320, the implementation unit 220 implements the policy configured by the configuration unit 210 to reuse the MBSFN subframe. Hereinafter, various configurations and their implementations will be illustrated, respectively.

Configuration I: using a subframe of a unicast type when reusing the MBSFN

The causes for an empty subframe include: data rate fluctuation, slow update frequency of SIB2, and resources retained after session end, etc. The MBMS service may be sent during a 320 ms/640 ms scheduling period, and the data may be buffered and smoothed on a 1-second level. Data measured in practice show that the percentage of unused MBSFN subframes is about 30%.

The configuration unit 210 may configure using a subframe of a unicast type when reusing the MBSFN subframe. In one example of the present invention, the MBSFN subframe comprises 6 orthogonal frequency division multiplexing (OFDM) symbols, while the unicast subframe includes 7 OFDM symbols. A transmission module 221 in the implementation unit 220 performs unicast communication on the reused MBSFN subframe based on the configuration by the configuration unit 210.

Configuration II: Mobility Measurement on the Reused BS Subframe is Inapplicable The configuration unit 210 may configure not performing mobility measurement when reusing the MBSFN subframe. Further, the measurement module 222 in the implementation unit 220 performs mobility measurement on other MBSFN subframes except the reused MBSFN based on the configuration by the configuration unit 210.

Configuration III: Not Consider the Reused Unicast when Configuring Neighboring Cell Information The configuration unit 210 may configure not considering the reused unicast into neighboring cell information. The storage module 223 in the implementation unit 220 does not include content regarding the unicast when configuring the stored neighboring cell list based on the configuration by the configuration unit 210. Preferably, here the neighboring cell information refers to a neighCellConfig signaling.

Hereinafter, Configuration II and Configuration III will be illustrated.

A preferred solution in the embodiments of the present invention is to use an MBSFN subframe allocation signaling and a neighCellConfig signaling. In this solution, the following two assumptions in the protocol are rewritten:

1. The UE believes that there is no scheduled unicast service data on the MBSFN subframe.
2. The radio resource control (RRC) signaling neighCellConfig indicates whether a neighboring cell has all/part/no MBSFN subframes identical to that of the current cell.

Preferably, the UE may be informed that unicast transmission is always permitted in these MBSFN subframes. If a neighboring cell uses MBSFN subframes to transmit unicast, because these subframes are sometimes used for MBSFN, while sometimes will not be used for MBSFN, the UE will not perform mobility measurement on these subframes.

If these MBSFN subframes are allowed to transmit unicast data, it would be almost impossible for the neighboring cell to have the same MBSFN subframe allocation as the current cell. Thus, thanks to the indication that unicast transmission is always permitted in the MBSFN subframes, extreme restraint may be applied to neighCellConfig. One possible manner is not to apply the MBSFN subframes (MBSFN subframes or reused MBSFN subframes) for mobility measurement. Moreover, preferably, the neighCellConfig is configured as if no unicast is inserted into the MBSFN.

Configuration IV: Indicate Subsframes Allowed to Use and Monitor DL Allocation on these Subframes The configuration unit 210 may configure an indication for an MBSFN subframe that will not be used any more and/or an MBSFN subframe that is allowed to be reused. The monitoring module 224 in the implementation unit 220 determines and monitors occurrence of such an MBSFN subframe that is set to be allowed to be reused. Preferably, the information regarding a subframe that will not be used any more and/or an MBSFN subframe that is allowed to be reused as configured by the configuration unit may be sent from a serving base station via a BCCH channel.

Briefly speaking, the solution as proposed in the embodiments of the present invention is to restrain a UE that simultaneously accepts MBMS and unicast from reusing an empty MBSFN subframe. However, the UE is required to perform uplink report, and preferably, it is only required to report once whether the UE stops receiving the MBMS during a unicast session period. It should be noted that it would not be too many users who view a mobile TV while receiving a unicast service; the voice service requires a continuous scheduling, such that it is not suitable for being allocated to a low-priority MBSFN subframe. This point can be implemented through configuring in a BCCH channel a safety margin for indicating a subframe that will not be reused any more (or a subframe allowed to be reused). The UE is merely required to monitor the subframe time for an MBSFN subframe that is set to be allowed to be used. Because the amount of reused subframes is not too much, this solution will not consume too many resources and is more applicable to the current setting.

Preferably, the above configuration information can be formulated by the user in the core network and issued to the mobile terminal.

In Rel 10, it is discussed that the unicast reuses an unused MBSFN subframe assigned to the eNB-relay in the Long Term Evolution-advanced (LTE-A). A solution is desired for the following two scenarios: if possible, the unicast reuses the unused MBSFN subframe for the MBSFN timing and eNB-relay timing. In this point, a potential exclusive indicator in dynamic scheduling information (DSI) is not a good candidate. However, in any cases, the solutions in RAN2 should perform indication while considering minimum impact on RAN1.

The solution as provided by the embodiments of the present invention guarantees that the UE can correctly read out the unicast subframe sent on the reused MBSFN subframe. Meanwhile, due to not involving the change on the physical layer, it is simpler than the prior solution and will not affect the existing protocol (for example, RAN1 protocol).

A person of skill in the art would readily recognize that steps of various above-described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the present invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The above description is merely for implementing the embodiments of the present invention, and those skilled in the art should understand that any modification or partial substitution without departing from the scope of the present invention should belong to the scope limited in the claims of the present invention. Therefore, the protection scope of the present invention should be governed by the protection scope of the claims.

The invention claimed is:

1. A method for reusing a multicast broadcast single frequency network (MBSFN) subframe, in relay communication, comprising:
    configuring a policy of using unicast on a reused MBSFN subframe; and
    implementing the configured policy to reuse the MBSFN subframe,
        wherein implementing the configured policy includes:
            not performing mobility measurement when reusing the MBSFN subframe, and
            performing mobility measurement on other MBSFN subframes than the reused MBSFN subframe.

2. A relay communication method according to claim 1, wherein the policy of using unicast on the reused MBSFN subframe comprises using a subframe of a unicast type when reusing the MBSFN; and
    the implementing the configured policy comprises performing unicast communication on the reused MBSFN subframe based on the configuration.

3. The relay communication method according to claim 2, wherein the policy of using unicast on the reused MBSFN subframe comprises not considering a reused unicast when configuring neighboring cell information; and
    the implementing the configured policy comprises not including a content regarding the unicast when configuring a stored neighboring cell list.

4. The relay communication method according to claim 3, wherein:
    the policy of using unicast on the reused MBSFN subframe comprises indicating an MBSFN subframe that will not be used anymore and/or an MBSFN subframe that is allowed to be reused; and
    the implementing the configured policy comprises determining and monitoring occurrence of an MBSFN subframe that is set to be allowed to be reused.

5. A mobile terminal comprising:
    at least one memory, and at least one processor configured to:
    establish a policy of using unicast on a reused MBSFN subframe, including not performing mobility measurement when reusing the MBSFN subframe;
    implement the established policy to reuse the MBSFN subframe, wherein the implementation includes performing mobility measurement on other MBSFN subframes than the reused MBSFN subframe.

6. The mobile terminal according to claim 5, wherein the at least one processor is further configured to use a subframe of a unicast type when reusing the MBSFN subframe; and
    wherein the at least one processor is further configured to perform unicast communication on the reused MBSFN subframe based on the established policy.

7. The mobile terminal according to claim 6, wherein the at least one processor is configured to not consider a reused unicast when configuring neighboring cell information; and
    wherein the at least one processor utilizes storage media operative to not include a content regarding the unicast when configuring a stored neighboring cell list.

8. The mobile terminal according to claim 7, wherein the at least one processor is configured to indicate that a subframe will not be used anymore and/or that an MBSFN subframe is allowed to be reused; and
    the at least one processor is configured to determine and monitor occurrence of a subframe that is an MBSFN subframe set to be allowed to be used.

9. A communication system comprising:
    a base station;
    a mobile terminal comprising:
    at least one memory, and at least one processor configured to:
    establish a policy of using unicast on a reused MBSFN subframe, including not performing mobility measurement when reusing the MBSFN subframe, and
    implement the established policy to reuse the MBSFN subframe, wherein the implementation includes performing mobility measurement on other MBSFN subframes than the reused MBSFN subframe; and
    a device for communication between base stations.

* * * * *